US010330998B2

(12) United States Patent
Okita (10) Patent No.: US 10,330,998 B2
(45) Date of Patent: Jun. 25, 2019

(54) DISPLAY DEVICE

(71) Applicant: Japan Display Inc., Minato-ku (JP)

(72) Inventor: Mitsutaka Okita, Tokyo (JP)

(73) Assignee: Japan Display Inc., Minato-ku (JP)

( * ) Notice: Subject to any disclaimer, the term of this patent is extended or adjusted under 35 U.S.C. 154(b) by 19 days.

(21) Appl. No.: 14/940,701

(22) Filed: Nov. 13, 2015

(65) Prior Publication Data

US 2016/0170276 A1    Jun. 16, 2016

(30) Foreign Application Priority Data

Dec. 15, 2014 (JP) .................................. 2014-252813

(51) Int. Cl.
| | | |
|---|---|---|
| *G09G 3/36* | (2006.01) | |
| *G02F 1/1343* | (2006.01) | |
| *G02F 1/1362* | (2006.01) | |
| *G02F 1/1335* | (2006.01) | |

(52) U.S. Cl.
CPC .. *G02F 1/136286* (2013.01); *G02F 1/134309* (2013.01); *G02F 1/136227* (2013.01); *G02F 1/133514* (2013.01); *G02F 2001/134345* (2013.01); *G02F 2001/134372* (2013.01)

(58) Field of Classification Search
CPC ......... G02F 1/136286; G02F 1/134309; G02F 1/133514; G02F 1/136227; G09G 3/36
See application file for complete search history.

(56) References Cited

U.S. PATENT DOCUMENTS

| | | | | |
|---|---|---|---|---|
| 2008/0084376 A1* | 4/2008 | Hirota | .................. | G09G 3/3607 345/88 |
| 2008/0211974 A1* | 9/2008 | Ikebe | ................ | G02F 1/134363 349/5 |
| 2008/0259257 A1* | 10/2008 | Aota | .................. | G02F 1/134363 349/106 |

(Continued)

FOREIGN PATENT DOCUMENTS

| | | |
|---|---|---|
| JP | 2004-78218 | 3/2004 |
| JP | 2008-502004 | 1/2008 |

(Continued)

OTHER PUBLICATIONS

Office Action dated Jun. 12, 2018, in Japanese Patent Application No. 2014-252813, filed Dec. 15, 2014, w/English-language Translation.

*Primary Examiner* — Michael H Caley
*Assistant Examiner* — Jonathan Y Jung
(74) *Attorney, Agent, or Firm* — Oblon, McClelland, Maier & Neustadt, L.L.P.

(57) ABSTRACT

According to one embodiment, a display device comprises a first substrate, the first substrate includes a gate line, first to third source lines, a first pixel electrode located between the first source line and the second source line and electrically connected with a first switching element, a second pixel electrode located between the first source line and the second source line and electrically connected with a second switching element, and a third pixel electrode intersecting the gate line, adjacent to the first pixel electrode and the second pixel electrode to sandwich the second source line and the third source line, and electrically connected with a third switching element.

13 Claims, 8 Drawing Sheets

(56) References Cited

U.S. PATENT DOCUMENTS

| | | | |
|---|---|---|---|
| 2009/0309821 A1* | 12/2009 | Tanno | G02F 1/133514 |
| | | | 345/87 |
| 2011/0181583 A1* | 7/2011 | Kim | G09G 3/3614 |
| | | | 345/212 |
| 2011/0291550 A1 | 12/2011 | Kim et al. | |
| 2014/0211128 A1* | 7/2014 | Yang | G02F 1/133514 |
| | | | 349/68 |

FOREIGN PATENT DOCUMENTS

| JP | 2008-96549 | 4/2008 |
|---|---|---|
| JP | 2011-249334 | 12/2011 |

* cited by examiner

DISPLAY DEVICE

CROSS-REFERENCE TO RELATED APPLICATIONS

This application is based upon and claims the benefit of priority from Japanese Patent Application No. 2014-252813, filed Dec. 15, 2014, the entire contents of which are incorporated herein by reference.

FIELD

Embodiments described herein relate generally to a display device.

BACKGROUND

In a display device comprising a pair of opposing substrates, a structure involving the bonding one of the substrates, on which signal lines, switching elements, pixel electrodes, etc., are formed, and the other substrate, on which a light-shielding layer, color filters, etc., are formed, has been widely adopted. In such a display device, if a displacement in the bonding between the substrates occurs, the colors of adjacent pixels are mixed, color mixing occurs, the signal lines and the light-shielding layer are displaced, and the aperture ratio is thereby lowered.

Recently, higher resolution and a higher aperture ratio have been required for display devices for smartphones and tablet computers. As the pixel size becomes small with a higher resolution, the aperture ratio is reduced since the proportion of signal lines and the light-shielding layer to the pixel area becomes higher. As an example of a technology for securing the aperture ratio while achieving high resolution, an organic electric field light-emitting display device in which a first sub-pixel emitting light of a first color and a second sub-pixel emitting light of a second color are arranged in the same column line, and a third sub-pixel emitting light of a third color is arranged in a column line adjacent to the column line in which the first sub-pixel and the second sub-pixel are arranged, is disclosed.

DETAILED DESCRIPTION

In general, according to one embodiment, a display device comprises a display panel in which a liquid crystal layer is held between a first substrate and a second substrate, the first substrate comprising: a gate line; first to third source lines intersecting the gate line; a first switching element electrically connected with the gate line and the first source line; a second switching element electrically connected with the gate line and the second source line; a third switching element electrically connected with the gate line and the third source line; a first pixel electrode located between the first source line and the second source line and electrically connected with the first switching element; a second pixel electrode located between the first source line and the second source line and electrically connected with the second switching element; and a third pixel electrode intersecting the gate line, adjacent to the first pixel electrode and the second pixel electrode to sandwich the second source line and the third source line, and electrically connected with the third switching element.

The embodiments will be described hereinafter with reference to the accompanying drawings. The disclosure is a mere example, and arbitrary change of gist which can be easily conceived by a person of ordinary skill in the art naturally falls within the inventive scope. To further clarify the explanations, the drawings may depict the width, thickness, shape, etc., of each portion as compared with an actual aspect, but they are mere examples and do not restrict the interpretation of the invention. In each drawing, like or similar elements disposed sequentially may not be denoted by reference numbers or symbols. In the specification and drawings, components that fulfill same or similar functions are denoted by the same reference number and their overlapping descriptions may be omitted.

In the present embodiment, a liquid crystal display device is described as an example of the display device. The liquid crystal display device can be used for, for example, various devices such as a smartphone, a tablet terminal, a mobile telephone terminal, a personal computer, a TV receiver, a vehicle-mounted device, and a game device. The major configuration explained in the present embodiment can also be applied to a self-luminous display device comprising an organic electroluminescent display element, etc., an electronic paper display device comprising a cataphoretic element, etc., a display device employing micro-electro-mechanical systems (MEMS), or a display device employing electrochromism.

Figure 1:
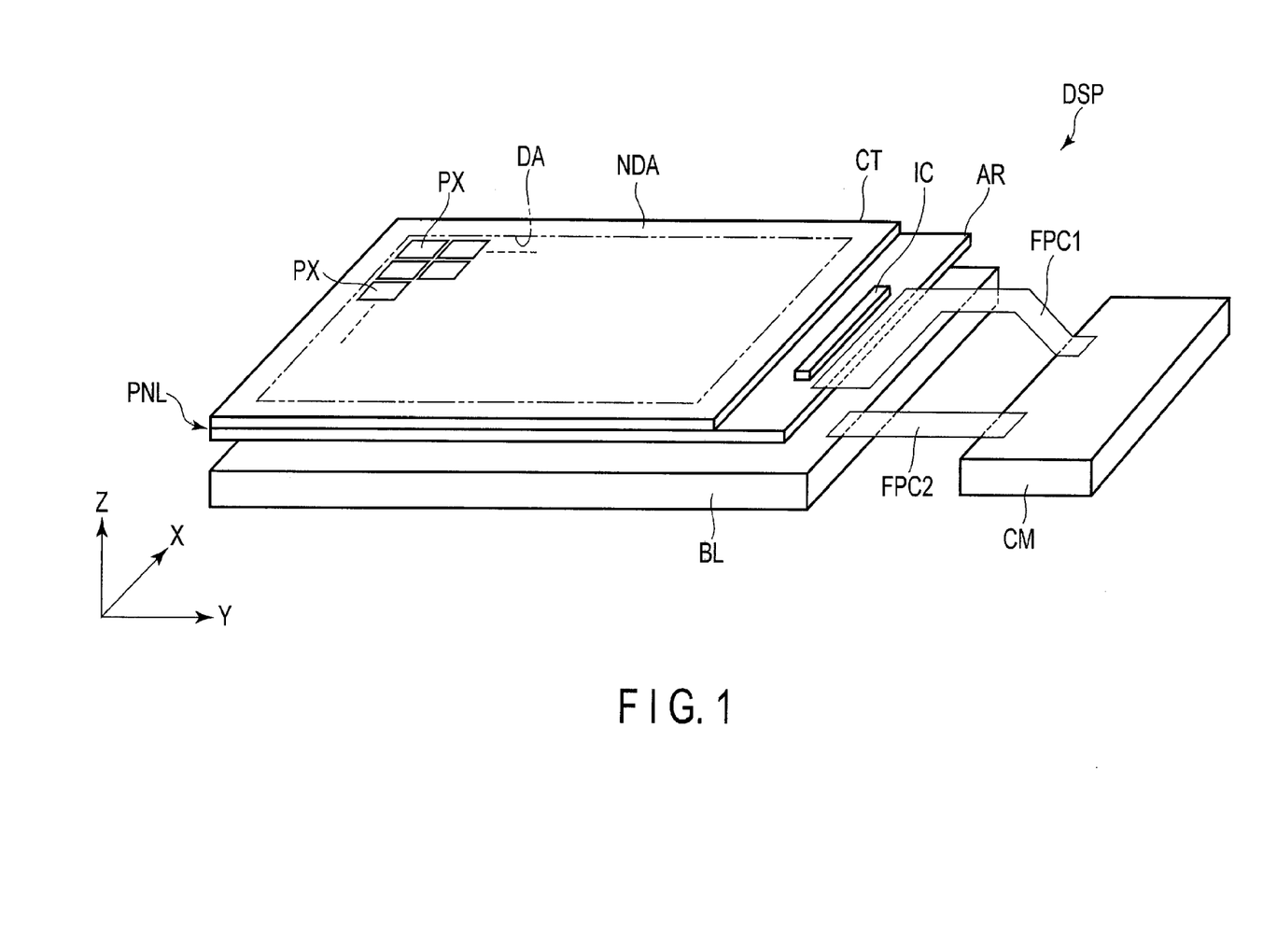
FIG. 1 is a perspective view schematically showing a configuration of a liquid crystal display device DSP.

FIG. 1 is a perspective view schematically showing a configuration of a liquid crystal display device DSP. The first direction X and the second direction Y are perpendicular to each other. A third direction Z is perpendicular to each of the first direction X and the second direction Y.

The liquid crystal display device DSP comprises an active matrix type liquid crystal display panel PNL, a driving IC chip IC which drives the liquid crystal display panel PNL, a backlight unit BL which illuminates the liquid crystal display panel PNL, a control module CM, flexible printed circuit boards FPC1, FPC2, etc.

The liquid crystal display panel PLN comprises an array substrate AR and a counter-substrate CT arranged to be opposed to the array substrate AR. In the present embodiment, array substrate AR functions as a first substrate and the counter-substrate CT functions as a second substrate. The liquid crystal display panel PNL includes a display area DA on which an image is displayed and a frame-shaped non-display area NDA which surrounds the display area DA. The liquid crystal display panel PNL also includes a plurality of pixels (corresponding to sub-pixels to be explained later) PX arrayed in a matrix in the first direction X and the second direction Y, in the display area DA.

A backlight unit BL is disposed on a back surface of the array substrate AR. Various types of units are applicable as the backlight unit BL, but the detailed explanations are omitted. The driving IC chip is mounted on the array substrate AR. The flexible printed circuit board FPC1 connects the liquid crystal display panel PNL and the control module CM. The flexible printed circuit board FPC2 connects the backlight unit BL and the control module CM.

The liquid crystal display device DSP having such a configuration corresponds to what is called a transmissive type liquid crystal display device which displays an image by selectively transmitting light incident from the backlight unit BL onto the liquid crystal display panel PNL in each pixel PX. However, the liquid crystal display device DSP may be a reflective type liquid crystal display device which displays an image by selectively reflecting external light incident from the outside onto the liquid crystal display panel PNL in each pixel PX or a transflective type liquid crystal display device having both transmissive and reflective functions.

Figure 2:
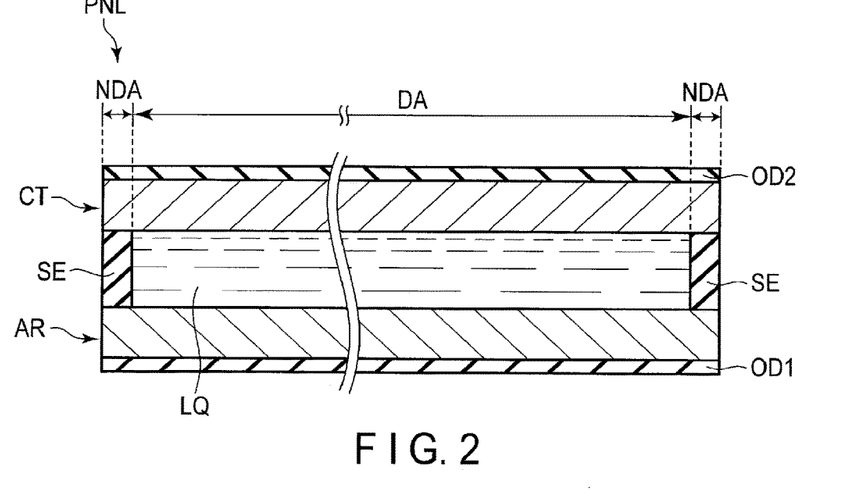
FIG. 2 is a schematic view showing a cross-section of the liquid crystal display panel PNL.

FIG. 2 is a schematic view showing a cross-section of the liquid crystal display panel PNL.

The liquid crystal display panel PNL comprises an array substrate AR, a counter-substrate CT, a liquid crystal layer LQ, a sealing member SE, a first optical element OD1, a second optical element OD2, etc. The array substrate AR and the counter-substrate CT will be explained in detail later.

The sealing member SE is disposed in the non-display area NDA to adhere the array substrate AR and the counter-substrate CT. The liquid crystal layer LQ is held between the array substrate AR and the counter-substrate CT. The first optical element OD1 is disposed on a side opposite to a surface of the array substrate AR which is in contact with the liquid crystal layer LQ. The second optical element OD2 is disposed on a side opposite to a surface of the counter-substrate CT which is in contact with the liquid crystal layer LQ. Each of the first optical element OD1 and the second optical element OD2 comprises a polarizer. Each of the first optical element OD1 and the second optical element OD2 may comprise other optical elements such as a retardation film.

Figure 3:
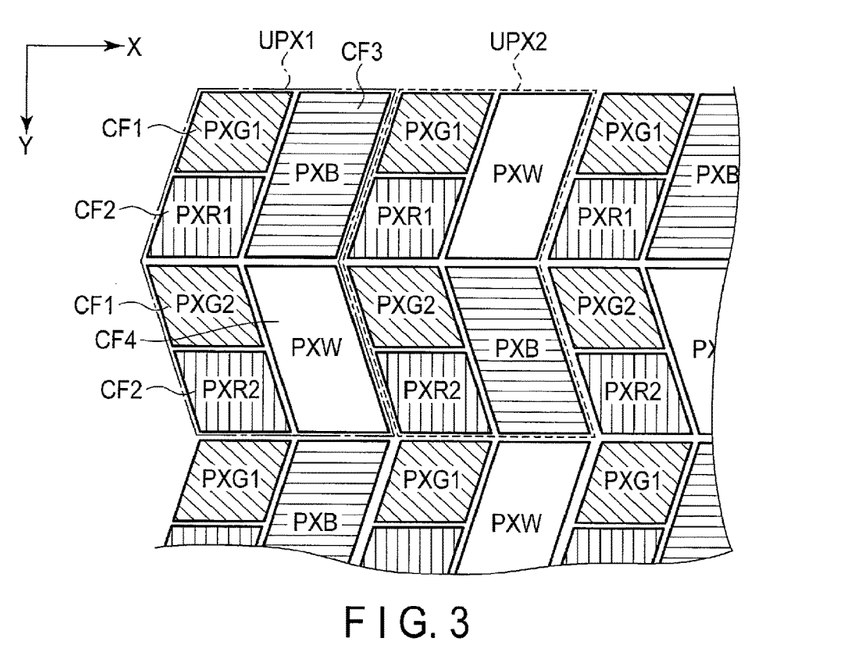
FIG. 3 is an illustration showing an example of the pixel array in the display area DA.

FIG. 3 is an illustration showing an example of the pixel array in the display area DA.

Two types of unit pixels, i.e., unit pixels UPX1 and UPX2 are illustrated in FIG. 3. Each of the unit pixels UPX1 and UPX2 corresponds to a minimum unit to display a color image. Each of the unit pixels UPX1 and UPX2 includes a sub-pixel PXG1, a sub-pixel PXR1, a sub-pixel PXB, a sub-pixel PXG2, a sub-pixel PXR2, and a sub-pixel PXW. Each of the sub-pixels PXG1 and PXG2 is a pixel displaying a first color and comprises a color filter CF1 of the first color. Each of the sub-pixels PXR1 and PXR2 is a pixel displaying a second color different from the first color and comprises a color filter CF2 of the second color. The sub-pixel PXB is a pixel displaying a third color different from the first and second colors and comprises a color filter CF3 of the third color. The sub-pixel PXW is a pixel displaying a fourth color different from the first to third colors and comprises a color filter CF4 of the fourth color. For example, the first color is green, the second color is red, the third color is blue, and the fourth color is white or substantially transparent. In this case, each of the color filters CF1 to CF3 is formed of a colored resin material. The color filter CF4 is formed of a transparent resin material or a light-colored resin material. The third color may be white or transparent and the fourth color may be blue.

However, each of the unit pixels UPX1 and UPX2 may include a sub-pixel displaying a color other than green, red, blue and white or may be constituted by sub-pixels of three colors, i.e., green, red and blue except a white sub-pixel. In the display area DA, unit pixels UPX of one type (i.e., unit pixels UPX1 alone or unit pixels UPX2 alone) may be disposed or unit pixels UPX of at least three types (i.e., the unit pixels UPX1, unit pixels UPX2, and unit pixels constituted in a different manner from the unit pixels UPX1 and UPX2) may be disposed.

In the present specification, for example, light having a wavelength range from 380 to 780 nm is defined as "visible light". "Blue" is defined as a color having a transmittance peak within a first wavelength range from 380 to 490 nm. "Green" is defined as a color having a transmittance peak within a second wavelength range from 490 to 590 nm. "Red" is defined as a color having a transmittance peak within a third wavelength range from 590 to 780 nm. The expression "substantially transparent" implies any visible light color in addition to an achromatic color.

The unit pixels UPX1 are repeatedly disposed along the second direction Y. Similarly, the unit pixels UPX2 are repeatedly disposed along the second direction Y. Columns of the unit pixels UPX1 arranged along the second direction Y and columns of the unit pixels UPX2 arranged along the second direction Y are disposed, alternately and repeatedly, along the first direction Y.

In each of the unit pixels UPX1 and UPX2, the sub-pixels PXG1 and PXR1 are adjacent to each other in the second direction Y, the sub-pixels PXG2 and PXR2 are adjacent to each other in the second direction Y, and the sub-pixels PXR1 and PXG2 are adjacent to each other in the second direction Y. In the unit pixel UPX1, the sub-pixel PXG1 and PXR1 are adjacent to the sub-pixel PXB in the first direction X, and the sub-pixels PXG2 and PXR2 are adjacent to the sub-pixel PXW in the first direction X. In the unit pixel UPX2, the sub-pixel PXG1 and PXR1 are adjacent to the sub-pixel PXW in the first direction X, and the sub-pixels PXG2 and PXR2 are adjacent to the sub-pixel PXB in the first direction X. The sub-pixel PXB of the unit pixel UPX1 is adjacent to the sub-pixels PXG1 and PXR1 of the unit pixel UPX2 in the first direction X. The sub-pixel PXW of the unit pixel UPX1 is adjacent to the sub-pixels PXG2 and PXR2 of the unit pixel UPX2 in the first direction X.

In the example of FIG. 3, the sub-pixels PXG1, PXG2, PXR1, and PXR2 have a substantially equal first area, and the sub-pixels PXB and PXW have a second area larger than the first area, in each of the unit pixels UPX1 and UPX2. For example, the second area is approximately double as large as the first area. For example, widths in the first direction X of the sub-pixels PXG1, PXG2, PXR1, PXR2, PXB and PXW are substantially equal, and a width in the second direction Y of the sub-pixels PXB and PXW is substantially twice the width in the second direction Y of each of the sub-pixels PXG1, PXG2, PXR1, and PXR2. In other words, an aperture ratio of the unit pixels UPX1 and UPX2 can be improved without reducing an effective resolution, by setting each of the blue sub-pixel PXB and the white sub-pixel PXW to be larger in size than each of the red sub-pixels PXR1 and PXR2, and the green sub-pixels PXG1 and PXG2, and reducing the number of the blue and white sub-pixels.

The sub-pixel PXB may have an area different from the sub-pixel PXW. The sub-pixels PXG1, PXG2, PXR1, and PXR2 may have areas different from each other.

The shape of the sub-pixels is not limited to an approximate parallelogram as shown in the drawing, but may be a square or a rectangle.

The color filters CF1 to CF4 are arranged in layout of the respective sub-pixels and have the areas corresponding to the sizes of the respective sub-pixels. In other words, the color filters CF1 and CF2 are formed in an island shape and are alternately arranged in the second direction Y. The color filters CF1 and CF2 have the substantially equal first area. The color filters CF3 and CF4 are formed in an island shape and are alternately arranged in the second direction Y. The color filters CF3 and CF4 have the substantially equal second area that is larger than the first area. For example, the second area is approximately double as large as the first area.

Figure 4:
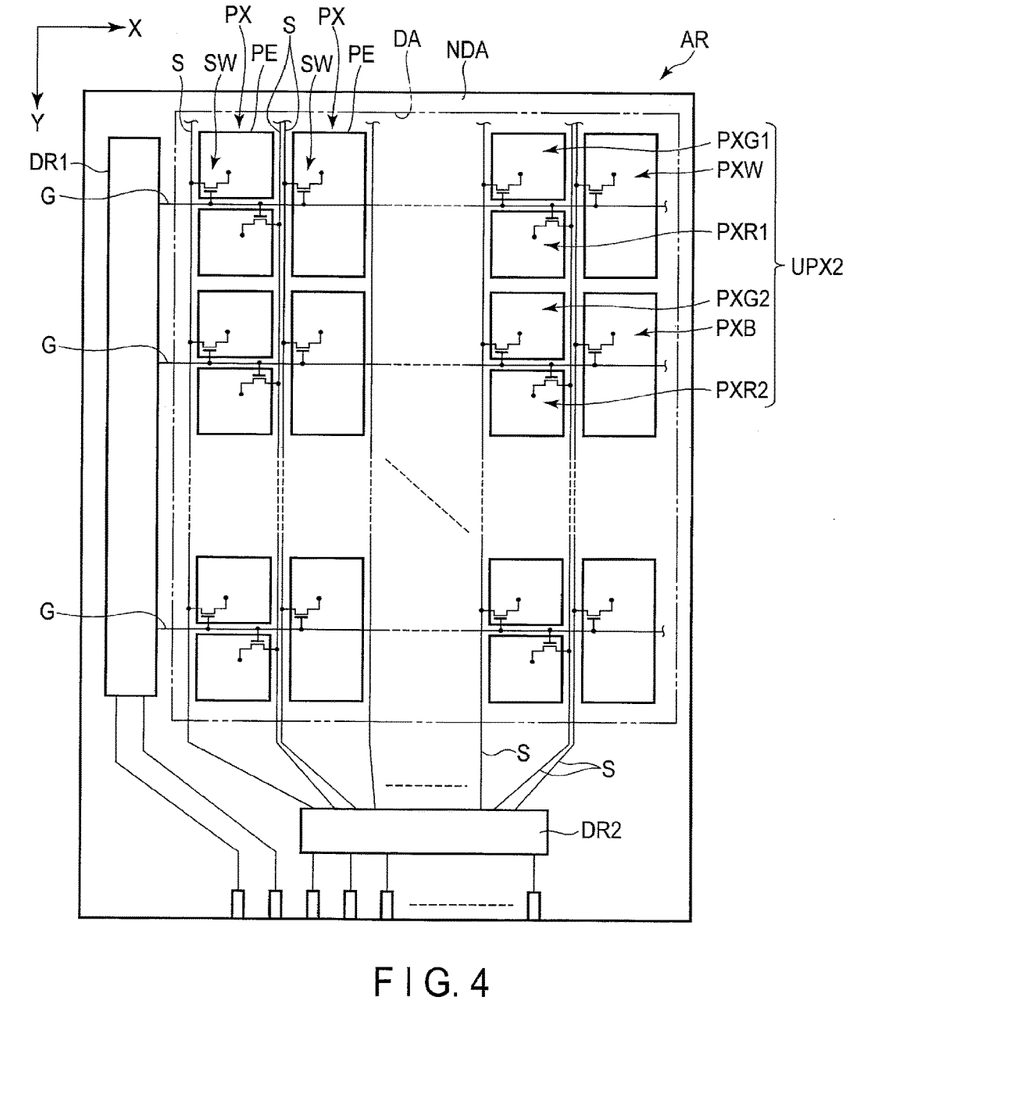
FIG. 4 is a plan view showing a schematic configuration of the array substrate AR.

FIG. 4 is a plan view showing a schematic configuration of the array substrate AR.

The array substrate AR comprises a gate line G, a source line S, a pixel electrode PE, a switching element SW, a first driving circuit DR1, a second driving circuit DR2, etc.

A plurality of gate lines G extend in the first direction X, and are spaced apart from each other and arranged in the second direction Y, in the display area DA. In the present embodiment, the gate lines G extend linearly in the first direction X. A plurality of source lines S extend in the second direction Y, intersect the plurality of gate lines G, and are spaced apart from each other and arranged in the first direction X, in the display area DA. The source lines S do not need to extend linearly, but may be bent in part or may extend in a direction intersecting the first direction X and the second direction Y. The pixel electrode PE and the switching element SW are arranged on each sub-pixel PX. The switching element SW is electrically connected with the gate line G and the source line S. The pixel electrode PE is electrically connected with the switching element SW.

In the example illustrated, the unit pixel UPX2 includes the sub-pixel PXG1, the sub-pixel PXR1, the sub-pixel PXB, the sub-pixel PXG2, the sub-pixel PXR2, and the sub-pixel PXW. Three source lines S and two gate lines G are allocated to the unit pixels UPX2 including six sub-pixels.

The first driving circuit DR1 and the second driving circuit DR2 are arranged in the non-display area NDA. The first driving circuit DR1 is electrically connected with the gate line G drawn out to the non-display area NDA. The second driving circuit DR2 is electrically connected with the source line S drawn out to the non-display area NDA. The first driving circuit DR1 outputs a control signal to each gate line G. The second driving circuit DR2 outputs an image signal to each source line S.

Figure 5:
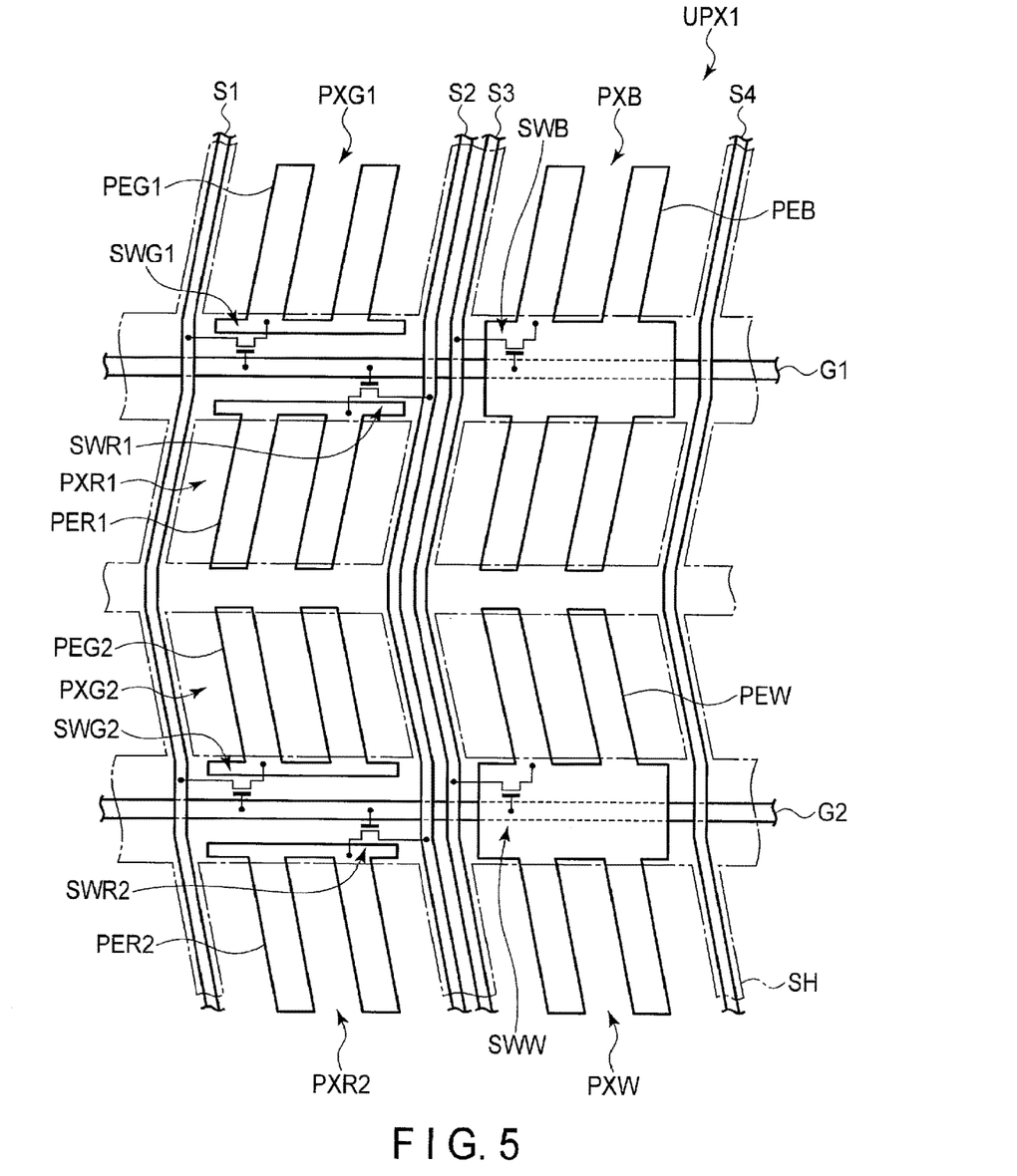
FIG. 5 is a schematic configuration view showing the unit pixel UPX1.

FIG. 5 is a schematic configuration view showing the unit pixel UPX1.

In the example illustrated, the unit pixel UPX1 is designed to correspond to fringe field switching (FFS) mode as a display mode, but the common electrode is not illustrated. Gate lines G1 and G2 and source lines S1 to S4 are formed on the array substrate while a light-shielding layer SH is formed on the counter-substrate. The light-shielding layer SH is represented by a one-dot-chained line in the drawing.

The sub-pixels PXG1, PXR1, PXG2, and PXR2 are formed between the source lines S1 and S2. The sub-pixels PXG1 and PXR1 are adjacent to each other in the second direction Y to sandwich the gate line G1. The sub-pixels PXR1 and PXG2 are adjacent to each other in the second direction Y without sandwiching any gate lines. The sub-pixels PXG2 and PXR2 are adjacent to each other in the second direction Y to sandwich the gate line G2. The sub-pixels PXB and PXW are formed between the source lines S3 and S4. The sub-pixels PXB and PXW are adjacent to each other in the second direction Y without sandwiching any gate lines. The gate line G1 crosses the sub-pixel PXB. The gate line G2 crosses the sub-pixel PXW. The sub-pixel PXB is adjacent to the sub-pixels PXG1 and PXR1 in the first direction X to sandwich the source lines S2 and S3. The sub-pixel PXW is adjacent to the sub-pixels PXG2 and PXR2 in the first direction X to sandwich the source lines S2 and S3.

The sub-pixel PXG1 comprises a switching element SWG1 electrically connected with the source line S1 and the gate line G1, and a pixel electrode PEG1 electrically connected with the switching element SWG1. The sub-pixel PXR1 comprises a switching element SWR1 electrically connected with the source line S2 and the gate line G1, and a pixel electrode PER1 electrically connected with the switching element SWR1. The sub-pixel PXG2 comprises a switching element SWG2 electrically connected with the source line S1 and the gate line G2, and a pixel electrode PEG2 electrically connected with the switching element SWG2. The sub-pixel PXR2 comprises a switching element SWR2 electrically connected with the source line S2 and the gate line G2, and a pixel electrode PER2 electrically connected with the switching element SWR2. The sub-pixel PXB comprises a switching element SWB electrically connected with the source line S3 and the gate line S1, and a pixel electrode PEB electrically connected with the switching element SWB. The sub-pixel PXW comprises a switching element SWW electrically connected with the source line S3 and the gate line G2, and a pixel electrode PEW electrically connected with the switching element SWW.

The pixel electrodes PEG1, PER1, PEG2, and PER2 are located between the source lines S1 and S2. The pixel electrodes PEG1 and PER1 are adjacent to each other in the second direction Y to sandwich the gate line G1. The pixel electrodes PER1 and PEG2 are adjacent to each other in the second direction Y without sandwiching any gate lines. The pixel electrodes PEG2 and PER2 are adjacent to each other in the second direction Y to sandwich the gate line G2. The pixel electrodes PEB and PEW are located between the source lines S3 and S4. The pixel electrodes PEB and PEW are adjacent to each other in the second direction Y without sandwiching any gate lines. The gate line G1 crosses the pixel electrode PEB. The gate line G2 crosses the pixel electrode PEW. The pixel electrode PEB is adjacent to the pixel electrodes PEG1 and PER1 in the first direction X to sandwich the source lines S2 and S3. The pixel electrode PEW is adjacent to the pixel electrodes PEG2 and PER2 in the first direction X to sandwich the source lines S2 and S3.

The light-shielding layer SH is formed in a band shape and opposed to the gate lines G1 and G2 and the source lines S1 to S4. The light-shielding layer SH is also opposed to each of the switching elements simply illustrated. An area surrounded by the light-shielding layer SH becomes an area which contributes to the display. In the light-shielding layer SH, a width of a position opposed to each of the source lines S2 and S3 is greater than a width of a position opposed to the source line S1 or a width of a position opposed to the source line S4. In addition, in the light-shielding layer SH, a width of a position opposed to the gate line G1 or G2 is greater than a width between the sub-pixels PXR1 and PXG2 or the sub-pixels PXB and PXW.

Figure 6:
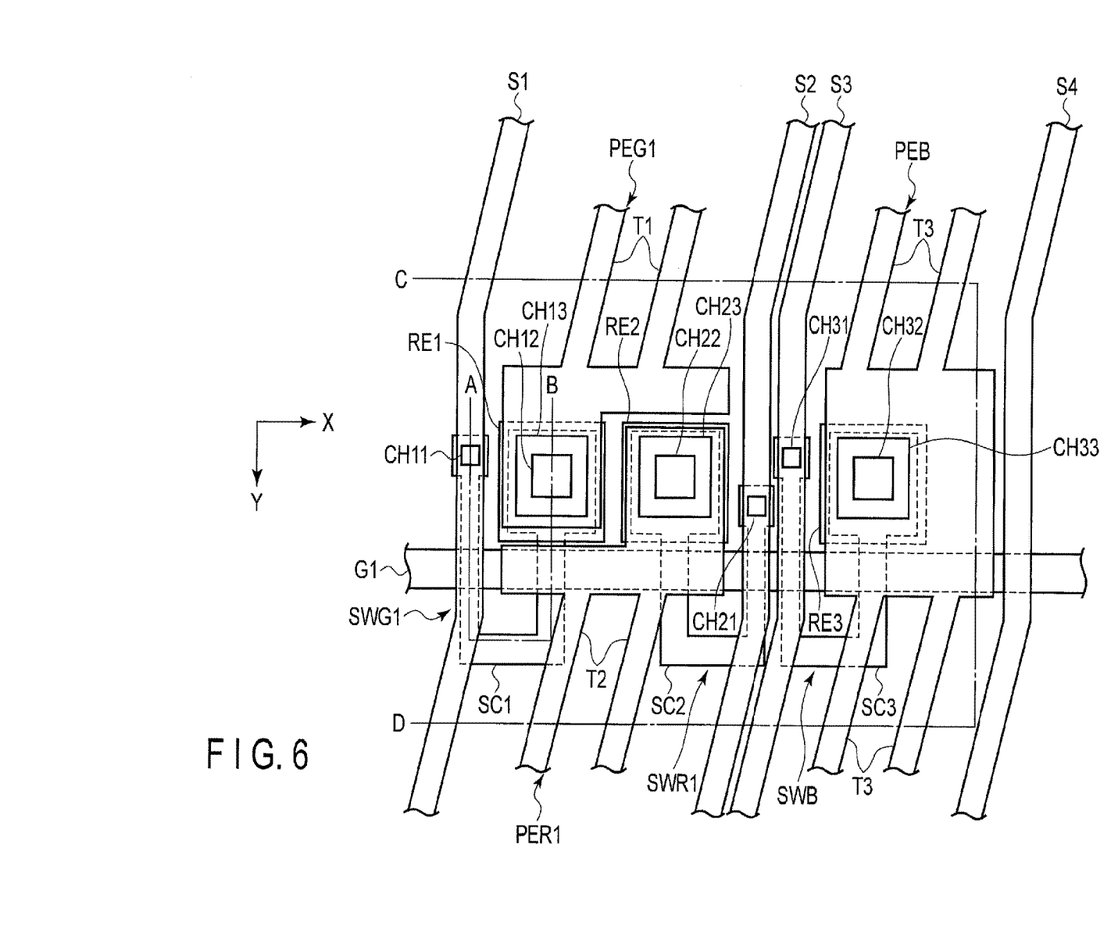
FIG. 6 is a schematic plan view showing a part of the unit pixel UPX1 shown in FIG. 5.

FIG. 6 is a schematic plan view showing a part of the unit pixel UPX1 shown in FIG. 5. The sub-pixels PXG1, PXR1, and PXB, of the unit pixel UPX1 shown in FIG. 5, are noticed. The configuration explained here can also be applied to the sub-pixels PXG2, PXR2, and PXW, of the unit pixel UPX1.

The switching element SWG1 comprises a semiconductor layer SC1 and a relay electrode RE1. The switching element SWR1 comprises a semiconductor layer SC2 and a relay electrode RE2. The switching element SWB comprises a semiconductor layer SC3 and a relay electrode RE3. Each of the semiconductor layers SC1 to SC3 is formed in a U-letter shape and intersects the gate line G1 at two parts. In other words, in the example illustrated, each of the switching elements SWG1, SWR1, and SWB is composed of a double-gate-type thin-film transistor.

One of ends of the semiconductor layer SC1 is electrically connected with the source line S1 through a contact hole CH11, and the other end is electrically connected with the relay electrode RE1 through a contact hole CH12. One of ends of the semiconductor layer SC2 is electrically connected with the source line S2 through a contact hole CH21, and the other end is electrically connected with the relay electrode RE2 through a contact hole CH22. One of ends of the semiconductor layer SC3 is electrically connected with the source line S3 through a contact hole CH31, and the other end is electrically connected with the relay electrode RE3 through a contact hole CH32. The contact holes CH11 and CH31 are located on the same straight line along the first direction X. The contact hole CH21 is located at a position displaced in the second direction Y with respect to the contact hole CH11, etc. In the example illustrated, the contact hole CH21 is located on a side closer to the gate line G1 than the contact hole CH11, etc.

The relay electrodes RE1 to RE3 are arranged on the same straight line along the gate line G1. In the example illustrated, the relay electrodes RE1 and RE2 are located between the source lines S1 and S2, and are aligned in the first direction X. The relay electrode RE3 is located between the source lines S3 and S4, and is aligned with the relay electrode RE2 in the first direction X to sandwich the source lines S2 and S3.

The pixel electrode PEG1 is electrically connected with the relay electrode RE1 through a contact hole CH13 without intersecting the gate line G1. The pixel electrode PER1 intersects the gate line G1 and is electrically connected with the relay electrode RE2 through a contact hole CH23. The pixel electrode PEB intersects the gate line G1 and is electrically connected with the relay electrode RE3 through a contact hole CH33.

The pixel electrode PEG1 comprises a comb electrode T1. The pixel electrode PER1 comprises a comb electrode T2. The pixel electrode PEB comprises a comb electrode T3. The comb electrodes T1 to T3 extend parallel to each other and, in the example illustrated, the comb electrodes extend in a direction intersecting the second direction Y clockwise at an acute angle. Each of the comb electrodes T1 to 13 extends toward the side remote from the gate line G1. In other words, the comb electrode T1 extends in a direction opposed to the comb electrode T2 so as to sandwich the gate line G1. In addition, the comb electrodes T3 extend in the both directions so as to sandwich the gate line G1.

Figure 7:
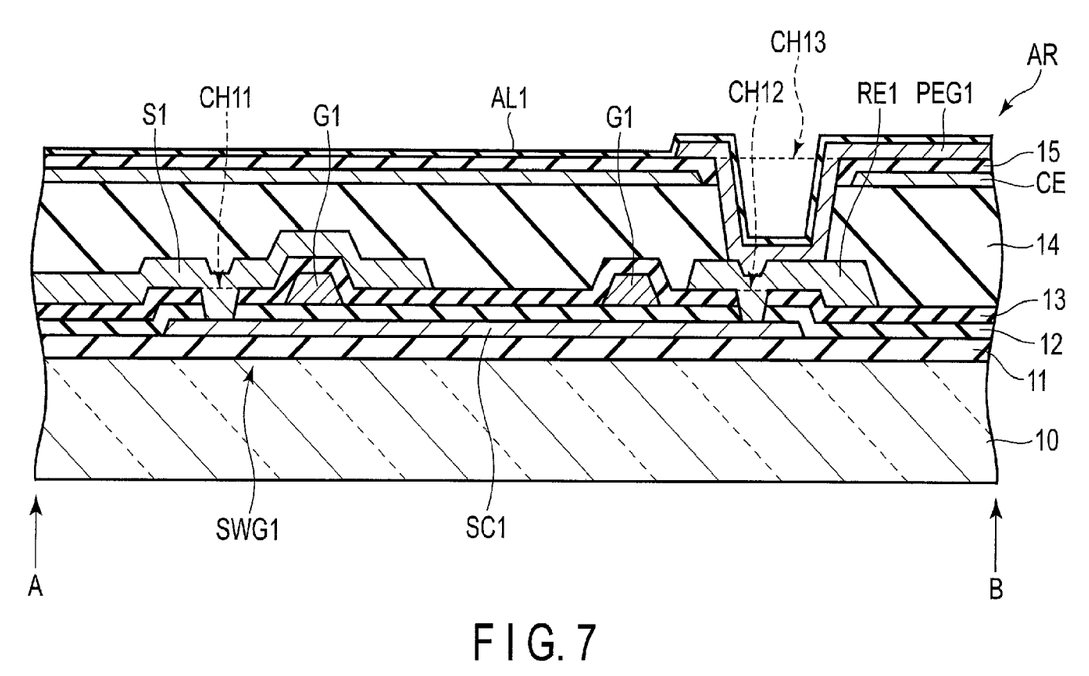
FIG. 7 is a schematic cross-sectional view of the array substrate AR seen along line A-B of FIG. 6.

FIG. 7 is a schematic cross-sectional view of the array substrate AR seen along line A-B of FIG. 6.

The array substrate AR is formed by using a first insulating substrate 10 having a light transmitting property such as a glass substrate or a resin substrate. The array substrate AR comprises a first insulating film 11, a second insulating film 12, a third insulating film 13, a fourth insulating film 14, a fifth insulating film 15, the switching element SWG1, the pixel electrode PEG1, a common electrode CE, a first alignment film AL1, etc. In the example illustrated, the switching element SWG1 is formed in a top-gate structure, but may be formed in a bottom-gate structure. In addition, in the example illustrated, the switching element SWG1 is composed of a double-gate type thin film transistor, but may be composed of a single-gate type thin film transistor.

The first insulating film 11 is formed on the first insulating substrate 10. The semiconductor layer SC1 of the switching element SWG1 is formed on the first insulating film 11. The semiconductor layers SC1 is formed of, for example, polycrystalline silicon, but may be formed of amorphous silicon, an oxide semiconductor, or the like.

The second insulating film 12 is formed on the first insulating film 11 and the semiconductor layer SC1. The gate line G1 is formed on the second insulating film 12 and opposed to the semiconductor layer SC1 at two parts. The third insulating film 13 is formed on the gate line G1 and the second insulating film 12. The source line S1 and the relay electrode RE1 are formed on the third insulating film 13. The source line S1 is in contact with the semiconductor layer SC1 through the contact hole CH11 which penetrates the second insulating film 12 and the third insulating film 13. The relay electrode RE1 is in contact with the semiconductor layer SC1 through the contact hole CH12 which penetrates the second insulating film 12 and the third insulating film 13.

The fourth insulating film 14 is formed on the third insulating film 13, the source line S1, and the relay electrode RE1. The common electrode CE is formed on the fourth insulating film 14. The fifth insulating film 15 is formed on the fourth insulating film 14 and the common electrode CE. The first insulating film 11, the second insulating film 12, the third insulating film 13, and the fifth insulating film 15 are formed of an inorganic material such as a silicon nitride (SiN) or a silicon oxide (SiO). The fourth insulating film 14 is formed of an organic material such as an acrylic resin.

The pixel electrode PEG1 is formed on the fifth insulating film 15. The pixel electrode PEG1 is in contact with the relay electrode RE1 through the contact hole CH13 which penetrates the fourth insulating film 14 and the fifth insulating film 15. The common electrode CE and the pixel electrode PEG1 are formed of a transparent, electrically conductive material such as indium tin oxide (ITO) or indium zinc oxide (IZO). The first alignment film AL1 is formed on the fifth insulating film 15 and the pixel electrode PEG1. The first alignment film AL1 is formed of, for example, a material having a horizontal alignment property.

Figure 8:
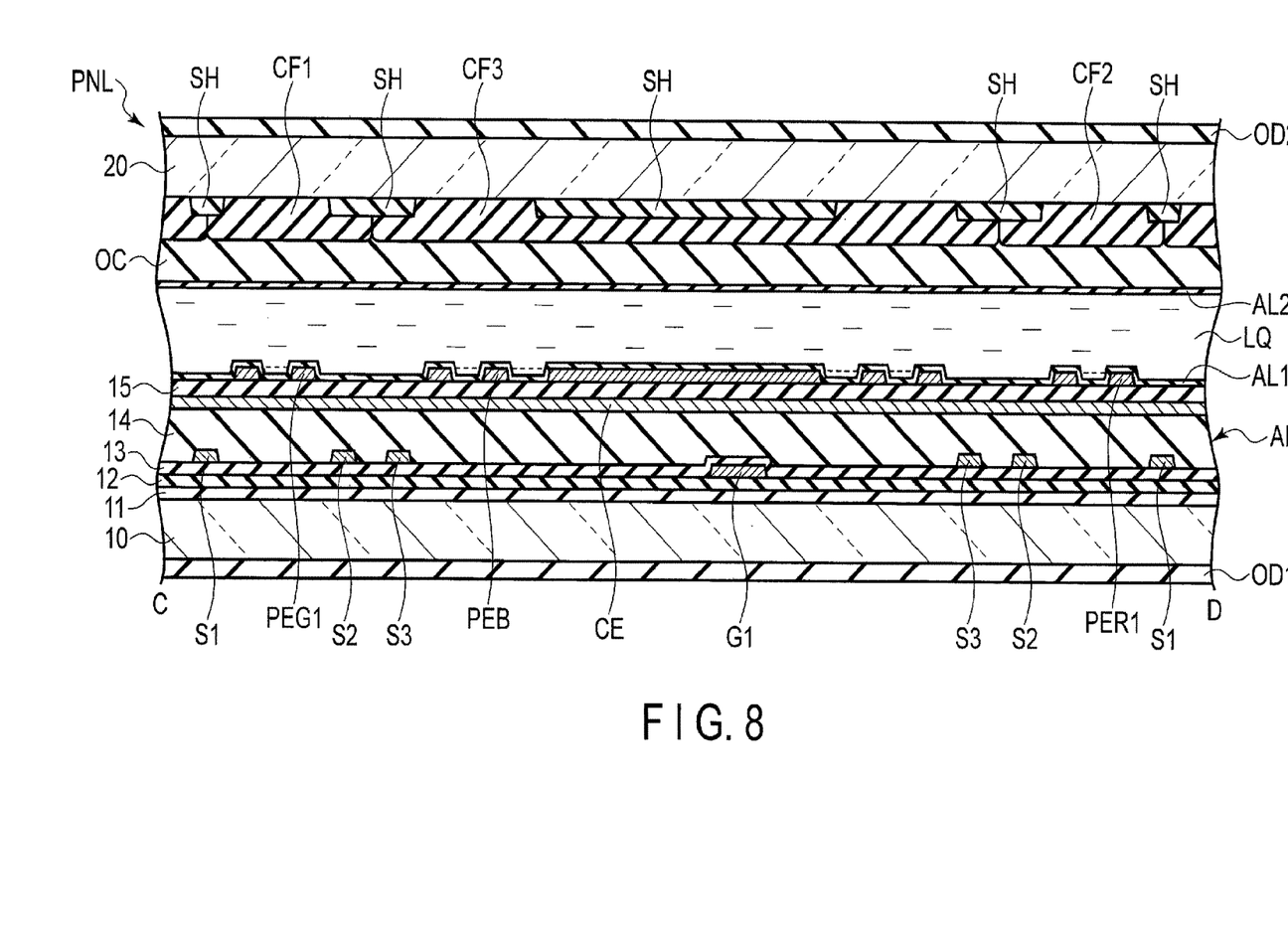
FIG. 8 is a schematic cross-sectional view of the liquid crystal display panel PNL seen along line A-B of FIG. 6.

FIG. 8 is a schematic cross-sectional view of the liquid crystal display panel PNL seen along line C-D of FIG. 6.

In the array substrate AR, the gate line G1 is formed on the second insulating film 12 and is covered with the third insulating film 13. The source lines S1 to S3 are formed on the third insulating film 13 and is covered with the fourth insulating film 14. The common electrode CE is formed on the fourth insulating film 14 and is covered with the fifth insulating film 15. In the example illustrated, the common electrode CE also extends to a position opposed to the gate line G1 and the source lines S1 to S3. The pixel electrodes PEG1, PER1, and PEB are formed on the fifth insulating film 15 and covered with the first alignment film AL1. Each of the pixel electrodes PEG1 and PER1 is located between the source lines S1 and S2, and opposed to the common electrode CE. The pixel electrode PEB is adjacent to the pixel electrodes PEG1 and PER1 to sandwich the source lines S2 and S3, and is opposed to the common electrode CE.

The counter-substrate CT is formed by using a second insulating substrate 20 having a light transmitting property such as a glass substrate or a resin substrate. The counter-substrate CT comprises the light-shielding layer SH, color filters CF1 to CF3, an overcoat layer OC, a second alignment film AL2, etc.

The light-shielding layer SH is formed on a side opposed to the array substrate AR of the second insulating substrate 20. The light-shielding layer SH is formed at a position opposed to the gate line G1 and the source lines S1 to S3. The color filter CF1 is opposed to the pixel electrode PEG1. The color filter CF2 is opposed to the pixel electrode PER1. The color filter CF3 is opposed to the pixel electrode PEB. Each end portion of the color filters CF1 to CF3 is superposed on the light-shielding layer SH. As explained above, for example, the color filter CF1 is a green color filter, the color filter CF2 is a red color filter, and the color filter CF3 is a blue color filter. The overcoat layer OC is formed of a transparent resin material to cover the color filters CF1 to CF3. The second alignment film AL2 is formed on a side of the overcoat layer OC, which is opposed to the array substrate AR. The second alignment film AL2 is formed of a material having a horizontal alignment property.

In the example illustrated, the color filters CF1 to CF3 are formed on the counter-substrate CT, but may be formed on the array substrate AR.

In addition, the pixel electrodes PEG1, PER1, and PEB can be replaced with the pixel electrodes PEG2, PER2, and PEW. If the pixel electrode PEB is replaced with the pixel electrode PEW, the color filter CF3 is replaced with the color filter CF4.

In the present embodiment, the unit pixel, UPX is composed of two pixel columns arranged in the first direction X, and can set the width of each sub-pixel in the first direction to be approximately 1.5 times as great as that in a unit pixel in which the red sub-pixel, the green sub-pixel and the blue sub-pixel are arranged in the first direction X. In other words, according to the present embodiment, a sub-pixel having a comparatively great width can be obtained and the lowering of the aperture ratio can be suppressed, in the display device having high resolution of 400 ppi or higher or 600 ppi level.

Since each sub-pixel has a comparatively great width along the first direction X, color mixing between the sub-pixels of different colors adjacent in the first direction X can be suppressed. In other words, the color mixing is caused by allowing the light incident on the liquid crystal display panel PNL from a direction inclined to a normal line of a main surface of the liquid crystal display panel PNL to pass through the color filters which do not match each other. For example, if a red color alone is displayed on the unit pixel, the light passing through the red color filter arranged on the red sub-pixel alone should contribute to the display, but the light passing through the blue color filter arranged on the blue sub-pixel adjacent to the red sub-pixel in the first direction X contributes to the display and the color mixing of red and blue is visually recognized. The mismatch light passing through the color filter of the adjacent sub-pixel and causing the color mixing is generated at a boundary between adjacent sub-pixels. If the sub-pixel size or the width in the first direction X of the sub-pixel is great, the rate of the mismatch light contributing to the display becomes extremely small since most of the light passes through the color filter of the color which should be inherently displayed and contributes to the display. For this reason, if the sub-pixel has a comparatively great width along the first direction X, the color mixing is hardly recognized visually and the deterioration in display quality can be suppressed.

In addition, the following advantage can also be obtained by the present embodiment.

Figure 9:
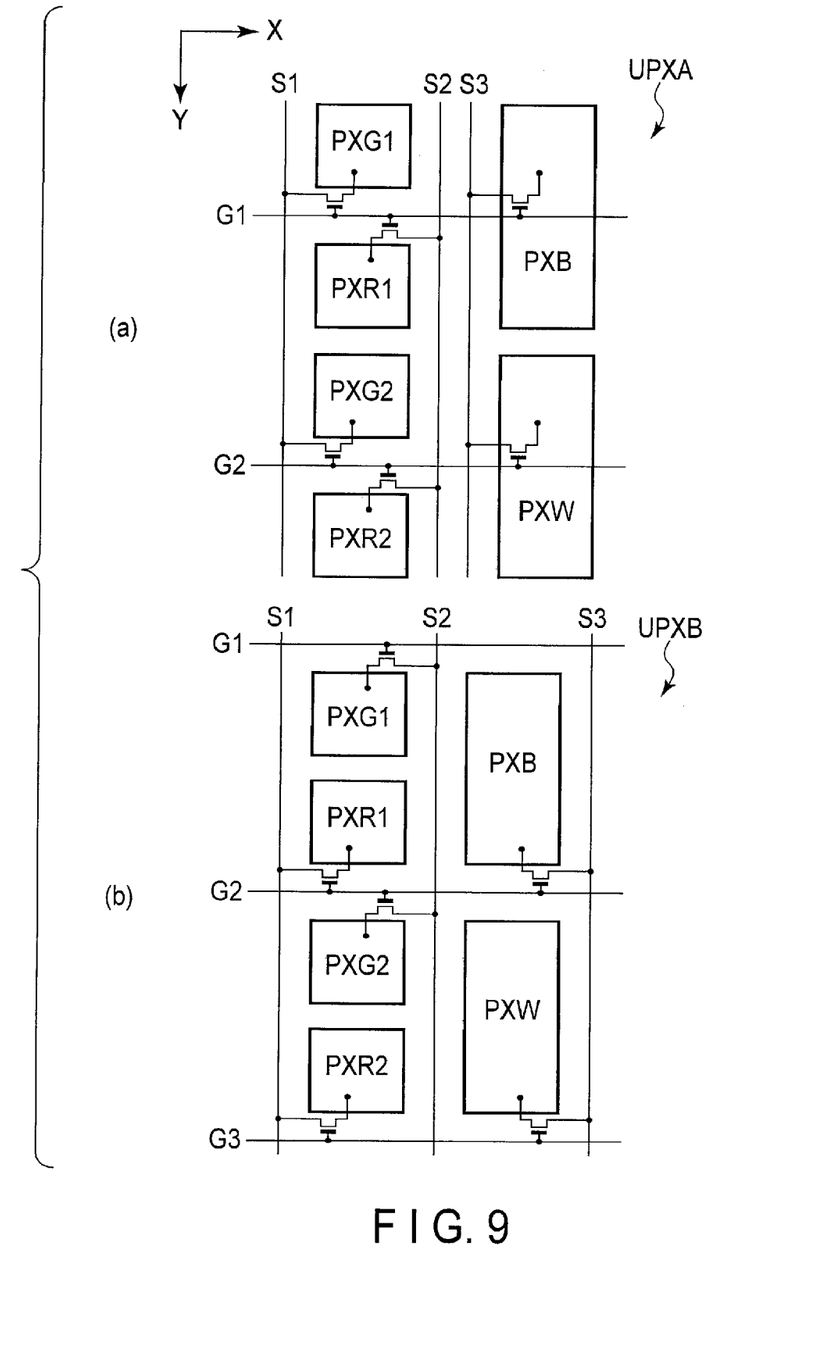
FIG. 9 is an illustration schematically showing a configuration of a unit pixel UPXA of the embodiment and a configuration of a unit pixel UPXB of a comparative example.

FIG. 9 is an illustration schematically showing a configuration of a unit pixel UPXA of the embodiment and a configuration of a unit pixel UPXB of a comparative example.

As shown in FIG. 9(a), two gate lines G1 and G2 and three source lines S1 to S3 are required in the unit pixel UPXA of the present embodiment. In contrast, as shown in FIG. 9(b), three gate lines G1 to G3 and three source lines S1 to S3 are required in the unit pixel UPXB of the comparative example. In other words, the number of gate lines can be reduced in the present embodiment than in the comparative example. For this reason, a selection period for selecting each gate line can be secured to be longer in a frame period, and shortage of write of an image signal to each pixel can also be suppressed in a high-resolution display device.

Incidentally, an aperture ratio of each sub-pixel is lowered when displacement between the array substrate AR and the counter-substrate CT occurs, in a configuration in which the light-shielding layer SH opposed to the signal lines such as the gate lines G and the source lines S is formed on the counter-substrate CT. In other words, in general, the array substrate AR and the counter-substrate CT are positioned such that the light-shielding layer SH is opposed to a position just above the signal line. In other words, the signal line is superposed on the light-shielding layer SH in an X-Y plane. In contrast, when the displacement occurs between the array substrate AR and the counter-substrate CT, the signal line and the light-shielding layer SH are displaced from each other in an X-Y plane. For this reason, the area of the non-display portion which does not contribute to the display is increased, which causes lowering of the aperture ratio at each sub-pixel.

In a comparative example shown in FIG. 9(b), the light-shielding layer SH is arranged at a position opposed to the gate lines G1 to G3 and the source lines S1 to S3. In the comparative example, if displacement occurs in any one of the first direction X and the second direction Y, the rate of lowering of the aperture ratio at the green sub-pixels PXG1 and PXG2 and red sub-pixels PXR1 and PXR2 is greater than that at the blue sub-pixel PXB. For this reason, the color balance is deteriorated and a desired white color chromaticity cannot be obtained as a result of the displacement.

In the present embodiment shown in FIG. 9(a), the light-shielding layer SH is arranged at a position opposed to the gate lines G1 and G2 and the source lines S1 to S3. Thus, in the present embodiment, even if displacement occurs in at least one of the first direction X and the second direction Y, the rate of lowering of the aperture ratio at the blue sub-pixel PXB, the green sub-pixels PXG1 and PXG2 and red sub-pixels PXR1 and PXR2 becomes substantially equal. For this reason, even if the displacement occurs, the variation in color balance can be reduced and the variation in desired white color chromaticity can also be reduced.

Furthermore, according to the present embodiment, the relay electrodes which relay signals between the switching elements connected to the same gate lines and the pixel electrodes are arranged on the same straight line. In the example shown in FIG. 6, the relay electrodes RE1 to RE3 are arranged on the same straight line along the gate line G1. For this reason, the width along the second direction Y of the light-shielding layer SH opposed to the gate line G1 and the relay electrodes RE1 to RE3 can be reduced as compared with a layout in which the relay electrodes RE1 and RE3 are arranged on one of sides to sandwich the gate line G1 while the relay electrode RE2 is arranged on the other side. In addition, large space to arrange the pixel electrodes can be secured in each sub-pixel. Thus, even if the resolution is increased, the area contributing to the display can be secured to be wide in each sub-pixel and the lowering of the display quality can be suppressed.

As explained above, a display device capable of suppressing the deterioration in display quality can be provided by the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising a display panel in which a liquid crystal layer is held between a first substrate and a second substrate, the first substrate comprising:

first and second gate lines;

first to third source lines intersecting the first and second gate lines;

a first switching element electrically connected with the first gate line and the first source line;

a second switching element electrically connected with the first gate line and the second source line;

a third switching element electrically connected with the first gate line and the third source line;

a fourth switching element electrically connected with the second gate line and the third source line;

a first pixel electrode located between the first source line and the second source line and electrically connected with the first switching element through a first contact hole;

a second pixel electrode located between the first source line and the second source line and electrically connected with the second switching element through a second contact hole;

a third pixel electrode intersecting the first gate line, adjacent to the first pixel electrode and the second pixel electrode to sandwich the second source line and the third source line, and electrically connected with the third switching element; and a fourth pixel electrode adjacent to the third pixel electrode and electrically connected with the fourth switching element, the first pixel electrode and the third pixel electrode being arranged along a first direction, the second pixel electrode and the third pixel electrode being arranged along the first direction, the first pixel electrode and the second pixel electrode arranged along a second direction crossing the first direction, and the third pixel electrode and the fourth pixel electrode being arranged along the second direction, wherein the second substrate comprises:

a light-shielding layer opposed to the first and second gate lines and the first to third source lines;

a first color filter of a first color, which is opposed to the first pixel electrode;

a second color filter of a second color different from the first color, which is opposed to the second pixel electrode;

a third color filter of a third color different from the first color and the second color, which is opposed to the third pixel electrode; and a fourth color filter of a fourth color different from the first to third colors, which is opposed to the fourth pixel electrode, the fourth color filter being white or transparent, the first contact hole and the second contact hole are arranged between the first source line and the second source line, the first contact hole and the second contact hole are arranged along the first direction on a same side with respect to the first gate line, and the second pixel electrode extends from a position of the second contact hole over the first gate line, extends along the second direction, and is located between the first gate line and the second gate line.

2. The display device of claim 1, wherein
each of the third color filter and the fourth color filter has an area greater than an area of the first color filter and an area of the second color filter.

3. The display device of claim 2, wherein
the area of the first color filter is substantially same as the area of the second color filter.

4. The display device of claim 3, wherein
the first color is green, the second color is red, the third color is blue, and the fourth color is white or transparent.

5. The display device of claim 1, wherein
the first switching element includes a first relay electrode,
the second switching element includes a second relay electrode,
the third switching element includes a third relay electrode, and
the first to third relay electrodes are arranged along the first direction on a same side with respect to the first gate line.

6. The display device of claim 5, wherein
the first and second relay electrodes are located between the first and second source lines, and
the third relay electrode is located between the second and third source lines, and aligned with the second relay electrode to sandwich the second source line.

7. The display device of claim 1, further comprising:
a third contact hole for connection between the first switching element and the first source line;
a fourth contact hole for connection between the second switching element and the second source line; and
a fifth contact hole for connection between the third switching element and the third source line,
wherein
the third and fifth contact holes are arranged along the first direction on a same side with respect to the first gate line, and
the fourth contact hole is located on a side closer to the first gate line than the third contact hole.

8. The display device of claim 1, wherein
the first pixel electrode comprises a first comb electrode, the second pixel electrode comprises a second comb electrode, and the third pixel electrode comprises third comb electrodes,
the first to third comb electrodes extend in directions parallel to each other,
the first comb electrode extends in a direction opposite to the second comb electrode to sandwich the first gate line, and the third comb electrodes extend in opposing directions to sandwich the first gate line.

9. The display device of claim 1, wherein the fourth pixel electrode intersects the second gate line.

10. The display device of claim 1, wherein
the first pixel electrode comprises a first comb electrode,
the second pixel electrode comprises a second comb electrode, and
the first comb electrode extends in a direction opposite to the second comb electrode to sandwich the first gate line.

11. The display device of claim 1, wherein
the first switching element includes a first relay electrode located on the first contact hole,
the second switching element includes a second relay electrode located on the second contact hole, and
the first and second relay electrodes are arranged along, the first direction on a same side with respect to the first gate line.

12. The display device of claim 11, wherein
the first pixel electrode overlaps the first relay electrode without intersecting the first gate line, and
the second pixel electrode intersects the first gate line and overlaps the second relay electrode.

13. The display device of claim 1, wherein
the first switching element includes a first semiconductor layer electrically connected with the first source line, and a first relay electrode electrically connected with the first semiconductor layer and the first pixel electrode,
the second switching element includes a second semiconductor layer electrically connected with the second source line, and a second relay electrode electrically connected with the second semiconductor layer and the second pixel electrode, and
the source lines are not disposed between the first relay electrode and the second relay electrode.

* * * * *